(12) United States Patent
Piras et al.

(10) Patent No.: US 12,345,737 B2
(45) Date of Patent: Jul. 1, 2025

(54) METHOD, SYSTEM AND COMPUTER PROGRAM FOR PERFORMING ACOUSTIC SCANNING PROBE MICROSCOPY

(71) Applicant: Nederlandse Organisatie voor toegepast-natuurwetenschappelijk onderzoek TNO, 's-Gravenhage (NL)

(72) Inventors: Daniele Piras, Amsterdam (NL); Paul Louis Maria Joseph Van Neer, Bergschenhoek (NL); Benoit Andre Jacques Quesson, 's-Gravenhage (NL); Laurent Fillinger, 's-Gravenhage (NL); Maarten Hubertus Van Es, Voorschoten (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 182 days.

(21) Appl. No.: 17/921,248

(22) PCT Filed: Apr. 26, 2021

(86) PCT No.: PCT/NL2021/050274
§ 371 (c)(1),
(2) Date: Oct. 25, 2022

(87) PCT Pub. No.: WO2021/221499
PCT Pub. Date: Nov. 4, 2021

(65) Prior Publication Data
US 2024/0219421 A1    Jul. 4, 2024

(30) Foreign Application Priority Data

Apr. 28, 2020   (EP) .................................. 20171890

(51) Int. Cl.
*G01Q 60/32*        (2010.01)

(52) U.S. Cl.
CPC .................................. *G01Q 60/32* (2013.01)

(58) Field of Classification Search
None
See application file for complete search history.

(56) References Cited

U.S. PATENT DOCUMENTS

2008/0276695 A1*  11/2008  Prater ................ G01N 29/0681
                                                        73/105
2011/0231965 A1    9/2011  Passian et al.

FOREIGN PATENT DOCUMENTS

| CN | 206848303 U | 1/2018 | |
|---|---|---|---|
| EP | 3232192 A1 * | 10/2017 | ......... G01N 29/0681 |
| JP | 2013-015407 A | 1/2013 | |

OTHER PUBLICATIONS

European Patent Office, International Search Report in corresponding International Application No. PCT/NL2021/050274, dated Jul. 6, 2021 (2 pages).

* cited by examiner

*Primary Examiner* — Eliza W Osenbaugh-Stewart
(74) *Attorney, Agent, or Firm* — Leydig, Voit & Mayer, Ltd.

(57) ABSTRACT

The present document relates to a method of performing acoustic scanning probe microscopy for imaging structures underneath a substrate surface, comprising: applying an acoustic input signal to the substrate having a frequency above 1 gigahertz, detecting a return signal, and analyzing the return signal for obtaining information on the embedded structures. The step of applying the acoustic input signal comprises applying a plurality of acoustic signal components which each include a selected frequency. The step of detecting includes detecting a response signal for each of the plurality of acoustic signal components. The frequencies are selected such that the components provide a composite (Continued)

signal being a pulse signal of limited time duration. The invention is further directed at a scanning probe microscopy system and a computer program product.

17 Claims, 6 Drawing Sheets

METHOD, SYSTEM AND COMPUTER PROGRAM FOR PERFORMING ACOUSTIC SCANNING PROBE MICROSCOPY

CROSS-REFERENCE TO RELATED APPLICATIONS

This patent application is a U.S. National Phase of PCT International Application No. PCT/NL2021/050274, filed Apr. 26, 2021, which claims priority to European Application No. 20171890.5, filed Apr. 28, 2020, which are both expressly incorporated by reference in their entireties, including any references contained therein.

FIELD OF THE INVENTION

The present invention is directed at a method of performing acoustic scanning probe microscopy for imaging of one or more embedded structures in a substrate underneath a substrate surface, the method comprising the steps of: applying, using a signal application actuator, an acoustic input signal to the substrate, wherein the acoustic input signal has a frequency above 1 gigahertz; detecting, using a probe of a scanning probe microscope, an acoustic return signal from the substrate; and analyzing the return signal for obtaining information on the embedded structures, for enabling imaging thereof. The invention is further directed at a scanning probe microscopy system and a computer program product.

BACKGROUND

Developments in the semiconductor industry used to be typically governed by Moore's law which predicted that the number of transistors in a dense integrated circuit would double every two years. The technological barriers to be overcome in order to meet Moore's prediction however have become increasingly more difficult to overcome in the past years, and have flattened the technological growth curve presently. One of the technological challenges that is encountered and needs to be overcome to meet the industry demands for even smaller and smaller integrated circuits, is the visibility or measurability of small nanometer sized structures that are hidden underneath a surface of a substrate, such as a wafer. Optical methods fall short due to the substrate material being opaque, whereas such structures may typically consist of various layers themselves and may be buried underneath a covering layer of tens of nanometers to a few micrometers.

A solution to overcome the above challenge may be found in the application of acoustic scanning probe microscopy methods using a scanning probe microscopy (SPM) system. These applications are based on applying an acoustic input signal to the substrate while measuring, using the probe of the SPM system, a return signal responsive to the input signal. If the applied acoustic input signal has frequencies in the gigahertz range, it is conveyed by the substrate material and will be scattered by structures embedded within the substrate. At the surface of the substrate, this scattering will be visible in the return signal's phase and amplitude. This return signal is picked up by the probe being (continuously or at least for a small period) in contact with the surface. To enable sensing of the return signal by the probe, use is typically made of downmixing of frequencies of a heterodyne signal. In accordance therewith, the acoustic input signal consists of at least two frequencies (e.g. a carrier frequency and a modulation frequency) in the gigahertz range, having a frequency difference at a much lower frequency (i.e. within a measurable frequency range of the probe). The mixing of the both frequencies provides a frequency component at the difference frequency, which can be sensed by the probe and provides the information about the subsurface geometry and embedded structures.

Although this process works well, a disadvantage thereof is provided by the fact that the acoustic input signal is a continuous wave signal which is not only scattered by the embedded structures, but by any encountered boundary or structure. Therefore, the acoustic input signal is also echoed by the outer surfaces of the substrate and by any layer interface internal to the substrate. This creates standing waves in the substrate that are detrimental to the signal-to-noise ratio (SNR) and thus make it difficult to detect the smallest of embedded structures. To overcome this, a very promising solution proposes to apply a distinct pulse of acoustic energy, i.e. a pulse of acoustic energy followed by a silent period or relaxation period. The application of a pulse prevents the formation of standing waves, and thereby prevents the occurrence of noise and disturbing interference therefrom. However, an additional problem is that acoustic SPM systems are typically equipped with continuous wave excitation capabilities that do not allow the application of a very short pulse signal (e.g. less than a microsecond in duration).

SUMMARY OF THE INVENTION

It is an object of the present invention to overcome the above disadvantages and provide method of performing acoustic scanning probe microscopy at gigahertz acoustic frequencies for enabling visualization of small embedded features at high resolution.

To this end, there is provided herewith a method as described above, wherein the step of applying the acoustic input signal comprises applying a plurality of acoustic signal components, wherein each acoustic signal component includes a selected frequency, and wherein the step of detecting includes detecting, for each of the plurality of acoustic signal components a response signal associated with the respective acoustic signal component; and wherein the frequencies of the acoustic signal components are selected such that together the plurality of acoustic signal components provide a composite signal, wherein the composite signal is a pulse signal of limited time duration.

In accordance with the present invention, a set of frequencies is selected which—if applied simultaneously—would provide a composite signal that at least mimics a pulse signal. This is based on the insight that a mix of carefully selected frequencies can interfere in a constructive and destructive manner to obtain an estimate of the desired pulse signal, similar to the forming of a beat signal constructed from a set of closely spaced frequencies.

The selected frequencies that form the ingredients of the acoustic input signal may be obtained in various different ways. In some embodiments, these frequencies may be found by experimentation, simulation, and/or calculation. In a further embodiment, an ideal pulse signal is determined by providing one or more of: a desired frequency, a maximum amplitude, a pulse duration and a pulse shape. This ideal pulse signal is then converted from the time domain into the frequency domain using a Fourier transform (e.g. fast Fourier transform (FFT)). The amplitude-frequency representation obtained by the Fourier transform operation may then be sampled, and a set of discrete sample frequencies is obtained that significantly contribute to the signal. Here, if more frequencies are selected that provide a significant contribution, the estimate of the ideal pulse will be more accurate. However, this will be at the cost of performance of the SPM sensing method in terms of duration of the measurement, because for each selected frequency a response signal must be obtained. Therefore, preferably an optimal number of frequencies is selected to mimic the ideal pulse.

In accordance with the invention, by applying each acoustic signal component including one of the selected frequencies, the response signal for each acoustic input signal component may be obtained from the output signal obtained with the probe. Together, from the obtained response signals, the response in terms of phase and/or amplitude may be obtained at each of these frequencies, and from this the pulse response signal—i.e. the response to the composite signal that mimics the ideal pulse—may be obtained using an inverse Fourier transformation (e.g. inverse fast Fourier transformation (IFFT)). To do this, from the e.g. amplitude measurements obtained at each frequency, a composite response signal in the frequency domain may be obtained. The inverse Fourier transformation converts the obtained composite response signal from the frequency domain back into the time domain to obtain the pulse response desired.

In fact, the plurality of acoustic signal components may all have equal mutual frequency differences such that the difference frequency (sometimes referred to as 'modulation frequency') falls within the sensitivity scale of the scanning probe microscope (SPM). The sensitivity scale is determined by the sensitivity of the cantilever itself and that of the sensing elements of the SPM system that are used for monitoring the cantilever response. The sensitivity of the cantilever is determined by the contact resonance frequencies of the cantilever, which in turn are related to the cantilever metrics and design, and to the interaction parameters of the interaction between the sample surface and the probe tip.

The acoustic signal components, when these would be mixed in a composite signal, would provide a beat signal with high power signal bursts that are repetitive at least at a pulse repetition frequency equal to the difference frequency. In fact, each two signal components of a composite signal having a mutual frequency difference at this difference frequency of the group will provide a contribution to the high power signal bursts in the composite signal, which adds to the total signal power of these bursts. Thus at the difference frequency, within the sensitivity frequency range of the system, all these components will aggregate to add up to provide high power signal bursts, and thereby would provide an excellent SNR. In the present invention, these burst are not directly applied to the sample, but only the continuous wave frequency components The acoustic input signal components may be applied using the continuous wave excitation capabilities of the SPM system. Therefore, provided that the SPM system comprises an acoustic excitation actuator suitable for applying gigahertz acoustic input signals, the method of the invention may be applied by applying e.g. subsequently at each location each of the acoustic signal components and measuring the response signal to each component. Therefore, in accordance with some embodiments, applying the acoustic signal components is performed in a plurality of subsequent application steps, wherein at least one acoustic signal component of the plurality of acoustic signal components is applied during each application step. Furthermore, in one such embodiment, a single acoustic signal component is applied during each step, and the detecting of the response signal associated with the respective acoustic signal component is performed during said application step thereof. The above may be performed at each location where measurement is desired to be performed, e.g. each location of a plurality of locations forming or spanning a scan area to be imaged.

In some embodiments, each acoustic signal component is applied having a carrier frequency at the selected frequency associated with the respective acoustic signal component and a modulation frequency such that a frequency difference between the carrier frequency and the modulation frequency is within a sensitivity range of the probe, and wherein the sensitivity range of the probe is provided by at least one range of frequencies around a resonant mode of the probe such as to provide a significantly detectable response signal. These embodiments apply the earlier explained heterodyne mixing that enables to obtain response signals for gigahertz input frequencies using a probe that is only sensitive to frequencies much below the gigahertz input frequencies (e.g. below 2 megahertz).

In some particular of these embodiments, which provide a particular advantage in terms of performance, at least a first acoustic signal component and a second acoustic signal component of the plurality of acoustic signal components are applied simultaneously, such that the first acoustic signal component is applied having a first frequency difference within a first sensitivity range around a first resonant mode of the probe, and the second acoustic signal component is applied having a second frequency difference within a second sensitivity range around a second resonant mode of the probe, the first resonant mode being different from the second resonant mode. This allows to measure the response signals of two acoustic signal components simultaneously, hence doubling the performance in terms of duration of the sensing method. In principle, the same may be done with three or more resonant modes instead of two, enabling to apply three or more acoustic signal components simultaneously, however interference between the three or more input signals will then hamper the accurate detectability of the response signals.

In some embodiments, each acoustic signal component is applied at a selected amplitude, and the selected amplitudes of each of the plurality of acoustic signal components are selected such as to correspond with amplitudes of the selected frequencies obtained from a Fourier transform of the composite signal. Here, the selected frequencies are not applied at a fixed amplitude, but the amplitudes with which these are applied is matched with the amplitude obtained from e.g. the amplitude-frequency representation of the ideal pulse signal that was obtained using the Fourier transform. The acoustic signal components are then applied in their proper relation (in terms of intensity) relative to each other. This prevents the necessity of scaling of response signals later, during analysis. Something similar may be done for the phase response. Hence, in some embodiments, each acoustic signal component is applied at a selected phase, and the selected phases of each of the plurality of acoustic signal components are selected such as to correspond with phases of the selected frequencies obtained from a Fourier transform of the composite signal.

There are alternatives to the above embodiments, which do fall within the scope of the claimed invention. For example, instead of tuning the individual amplitudes and/or phases of the signals, this can be performed in postprocessing of the signals. For example, instead of applying a signal at a desired frequency of A0, it may likewise be applied with a frequency A1 and the output signal may be compensated by multiplication with factor A0/A1. Likewise, with respect of the phase, the signal may be time shifted to adapt the phase in postprocessing. Hence, the above are mere embodiments of one way of applying the invention.

In some embodiments, the step of analyzing includes analyzing at least one of an amplitude or phase of the return signal. This information is desired in order to provide the desired pulse response at the end.

In some embodiments, the probe includes a cantilever and a probe tip, and wherein the step of detecting is performed by scanning the probe relative to the substrate in a direction parallel to surface such that the probe tip, continuously or periodically, is in contact with the substrate surface for obtaining measurements of the return signal in a plurality of surface locations, and wherein the step of detecting the response signal for each of the plurality of acoustic signal components is performed in each of the plurality of surface locations. However, in other or further embodiments, the step of detecting is performed using a probe array comprising a plurality of probes such as to enable obtaining the measurements in multiple of the plurality of surface locations simultaneously. The determination of the response signal at multiple locations (subsequently or simultaneously) enables to obtain a response field signal for an area, from which detailed geometrical information may be obtained from the internal structure of the substrate. For example, triangulation or trilateration over at least three or at least four locations respectively, enables accurate determination of an exact location of an embedded feature. Hence, in some of such embodiments, at least one of the amplitude or the phase of each return signal associated with each acoustic signal component is analyzed for each of the plurality of surface locations, such as to provide a measurement map including the at least one of the amplitudes or phases of each return signal.

As described hereinabove, in some embodiments, the step of analyzing further comprises obtaining from the return signals of the plurality of acoustic signal components for at least one surface location, and performing an inverse Fourier transform such as to obtain a pulse response signal in a time domain indicative of a response to the pulse provided by the composite signal.

Furthermore, another difficulty may be experienced with respect to the phase response of the cantilever of the probe around a resonant mode. As is known, by crossing the resonant frequency of a resonant mode, the phase of the response signal will jump with n radians. This must be taken into account while analyzing the return signals, in case these are obtained close to a resonant mode. This is especially the case where amplitudes differences may be too small to retrieve valuable information, as in that case the phase information can be very useful. Remote from a resonant mode, such compensation is not needed because the phase will only differ around resonant modes. However, in situations wherein the signals are sensed near a resonant mode (where they provide a strong response signal), the phase dependency may be reviewed first by an initialization step of the method. In these embodiments, the probe includes a cantilever and a probe tip, and the method further comprises, prior to performing the steps of applying, detecting and analyzing, a step of determining a cantilever phase response around at least one resonant mode of the probe, including: applying a reference carrier frequency and at least one reference modulation frequency, and sweeping the reference modulation frequency such as to provide a varying frequency difference; detecting, using the probe wherein the probe tip is in contact with the substrate surface, a reference response signal; and analyzing the reference response signal to determine a phase response of the cantilever around the at least one resonant mode of the probe.

In accordance with a second aspect, there is provided an acoustic scanning probe microscopy system for use in a method according to the first aspect, comprising a scan head including a probe, the probe including a cantilever and a probe tip, wherein the system comprises a substrate carrier for holding a substrate having a substrate surface, wherein the system is configured for scanning the scan head relative to the substrate carrier for scanning the substrate surface with the probe, such that the probe tip is in contact with the substrate surface continuously or at least periodically, wherein the system comprises a controller and a memory operatively connected to the controller, wherein the system is configured for receiving one or more instructions which when loaded in the memory of the system cause the controller to control the system such as to: apply, using a signal application actuator, an acoustic input signal to the substrate, wherein the acoustic input signal has a frequency above 1 gigahertz; detect, using the probe, an acoustic return signal from the substrate; and analyze, by the controller, the return signal for obtaining information on the embedded structures, for enabling imaging thereof; wherein the step of applying the acoustic input signal comprises applying a plurality of acoustic signal components, wherein each acoustic signal component includes a selected frequency, and wherein the step of detecting includes detecting, for each of the plurality of acoustic signal components a response signal associated with the respective acoustic signal component; wherein the frequencies of the acoustic signal components are selected such that together the plurality of acoustic signal components provide a composite signal, wherein the composite signal is a pulse signal of limited time duration.

In accordance with a third aspect, there is provided a computer program product for use in a system according to claim 14, the product including one or more instructions which when loaded in a memory of the system cause a controller of the system to control the system such as to: apply, using a signal application actuator of the system, an acoustic input signal to a substrate held by a substrate carrier, wherein the acoustic input signal has a frequency above 1 gigahertz; detect, using a probe of the system, an acoustic return signal from the substrate; and analyze, by the controller, the return signal for obtaining information on embedded structures in the substrate underneath a substrate surface, for enabling imaging thereof; wherein the step of applying the acoustic input signal comprises applying a plurality of acoustic signal components, wherein each acoustic signal component includes a selected frequency, and wherein the step of detecting includes detecting, for each of the plurality of acoustic signal components a response signal associated with the respective acoustic signal component; wherein the frequencies of the acoustic signal components are selected such that together the plurality of acoustic signal components provide a composite signal, wherein the composite signal is a pulse signal of limited time duration.

BRIEF DESCRIPTION OF THE DRAWINGS

The invention will further be elucidated by description of some specific embodiments thereof, making reference to the attached drawings. The detailed description provides examples of possible implementations of the invention, but is not to be regarded as describing the only embodiments falling under the scope. The scope of the invention is defined in the claims, and the description is to be regarded as illustrative without being restrictive on the invention. In the drawings:

DETAILED DESCRIPTION

Figure 1:
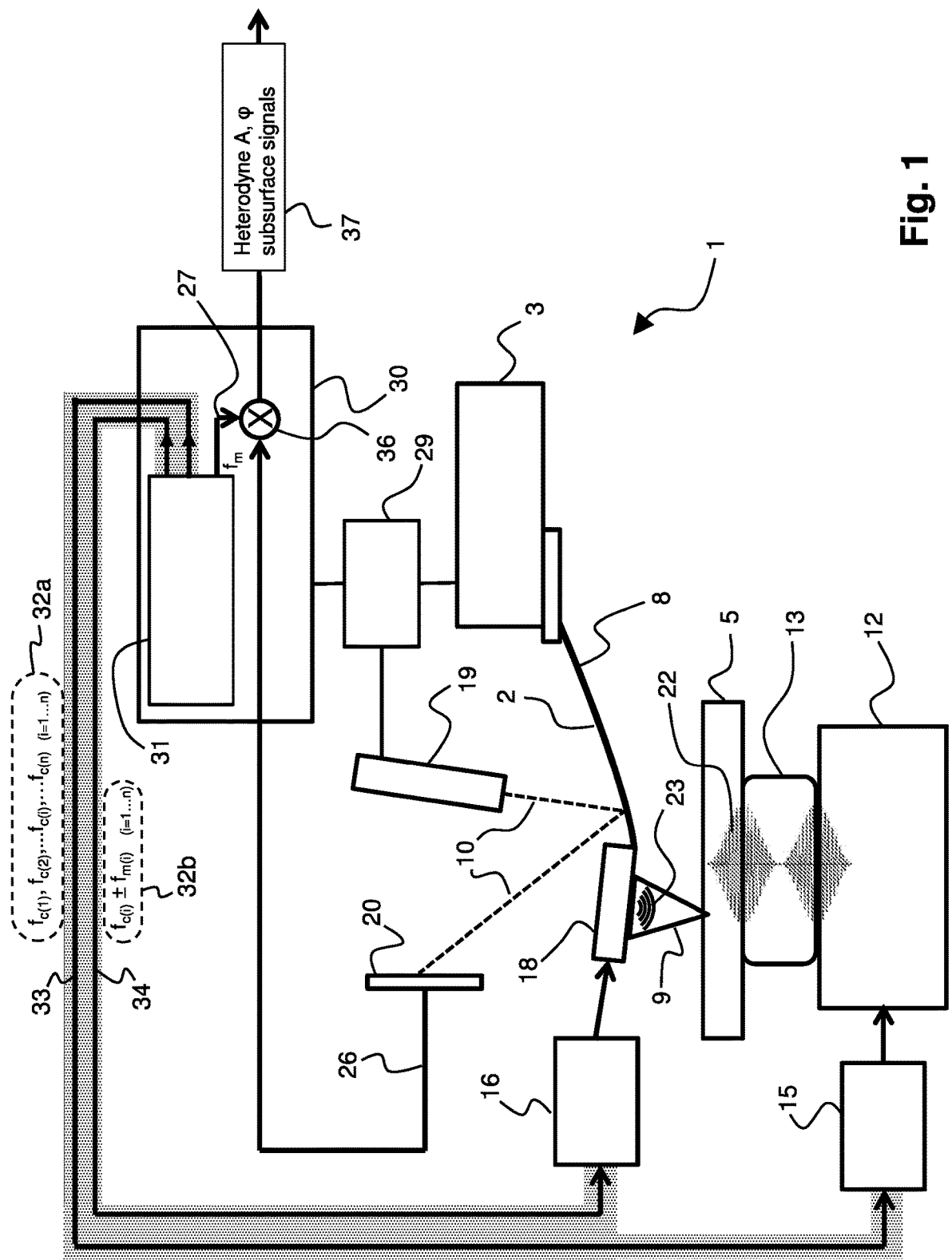
FIG. 1 schematically illustrates a system in accordance with an embodiment of the invention, for performing a method in accordance with the invention.

FIG. 1 schematically illustrates a scanning probe microscopy system 1 in accordance with an embodiment, configured for use in a method in accordance with an embodiment of the invention. In the system 1, a probe 2 is attached to a scan head 3. The scan head 3 enables scanning of the probe 2 relative to the surface of a sample 5. The probe 2 consists of a cantilever 8 and a probe tip 9. During scanning, the probe tip 9 is brought in contact with the surface of the sample 5. For example the probe tip 9 may be scanned across the surface of the sample 5 in contact mode (continuous contact between the probe tip 9 and the surface of the sample 5). A laser unit 19 provides a laser beam 10 that impinges on the cantilever 8 and reflects towards an optical detector 20. Using the optical detector 20, vibrations in the cantilever 8 can be sensed due to small deflections of the reflected beam 10 under influence of such vibrations. This provides an output signal 26 for further analysis.

In accordance with the present invention, to obtain an input signal sequence 32 (consisting of 32a and 32b), a generator 31 generates a number of acoustic input signal components 32a and a number of additional signal components 32b for applying an acoustic input signal to the sample. The acoustic input signal components 32a may be pre-set by an operator at a number of selected frequencies $f_{e(i)}$, or may be determined by (manual or (semi)automatic) selection of frequencies fed) based on an fast Fourier transform (FFT) analysis of a predetermined desired pulse signal, e.g. using a controller 29 cooperating with the analysis system 30. The additional signal components 32b are based on the acoustic input signal components 32a, but distinguish by their frequencies $f_{s(i)}$: the frequency $f_{s(i)}$ of the additional signal components 32b differs from the frequency $f_{e(i)}$ of the momentary acoustic input signal component 32a by a modulation frequency $f_{m(i)}$. The acoustic input signal sequence 32 at least consists of a first part 33 and a second part 34. The first part 33 provides the acoustic input signal components 32a sequentially, each acoustic input signal component 32a-i having a frequency $f_{e(i)}$. The second part 34 provides an additional signal component 32b-i that is periodic with a frequency $f_{s(i)}$, wherein $f_{s(i)}$ equals the carrier frequency $f_{e(i)}$ of the $i^{th}$ acoustic input signal component 32a-i plus or minus (or both in case two additional signal components $f_{s1(i)}$ and $f_{s2(i)}$ are provided) a modulation frequency $f_{m(i)}$. The integer i is an index integer ranging from 1 to n (with $n \in \mathbb{N}$), wherein n is the total number of selected frequencies for the acoustic input signal components 32a (i.e. the number of components 32a).

The frequencies $f_c$ and $f_{s(i)}$ are in the gigahertz range (i.e. >1 GHz) in order to perform scattering based acoustic scanning probe microscopy. The modulation frequencies $f_{m(i)}$ may be determined by controller 29 and are dependent on the resonant modes of the probe 2, which are mainly determined by the contact resonant modes of the cantilever 8. In many applications, the modulation frequencies are in a range around the lowest resonant mode where the cantilever is most sensitive to vibrational stimulation. Typically, this may be within the full width at half maximum (FWHM) of the response peak of the cantilever's 8 transfer function, or stated otherwise, in the frequency range wherein the magnitude of the response of the cantilever to is not less than half the magnitude of the response at the resonant frequency at the lowest resonant mode. Similarly, other, higher resonant modes may likewise be used. Furthermore, in some embodiments, two of the acoustic input signal components 32a (e.g. at $f_{e(i)}$ and $f_{e(i+1)}$ may simultaneously be applied with corresponding additional signal components 32b with frequencies $f_{s(i)}$ and $f_{s(i+1)}$ separated from frequencies $f_{e(i)}$ and $f_{e(i+1)}$ at two different modulation frequencies $f_{m(i)}$ and $f_{m(i)}$, such that $f_{m(i)}$ corresponds to a frequency near a first resonant mode of the cantilever 8 and $f_{m(i+1)}$ corresponds to a frequency near a second resonant mode of the cantilever 8. The latter will enable to apply multiple signals simultaneously during one sequence step, without this being too detrimental to the measurements.

In the example illustrated in FIG. 1, the first part 33 of the acoustic input signal sequence 32 will bear the acoustic input signal components 32a at the selected frequencies $f_{e(i)}$ and the second part 34 will bear the additional signal components 32b needed for downmixing of the gigahertz signals at $f_{e(i)}$ to the sensitivity range of the probe 2. Separating these signals into a first part 33 and a second part 34 enables to apply both parts to different parts of the system, e.g. the sample 5 via transducer 12 and the cantilever 8 via transducer 18. This is not a requirement though, e.g. as will become apparent further below. Both the first input signal part 33 and the second input signal part 34 are converted into an acoustic signal to be applied during scanning. In the embodiment of FIG. 1, a transducer unit 18 is in contact with a probe tip 9, and receives the second input signal part 34 including the additional signal components 32b that are amplified using power amplifier 16. The transducer 18 converts the second input signal part 34 to an acoustic signal 23 applied to the probe tip 9. Moreover, the first input signal part 33 comprising the acoustic input signal components 32a is amplified in power amplifier 15 and provided to transducer 12 underneath the sample 5. A coupling medium 13 (e.g. wax) provides for acoustic coupling between the transducer 12 and the sample 5. The second input signal part 33 amplified using power amplifier 15 is converted into an acoustic signal 22 to be applied via the coupling medium 13 to the sample 5.

The acoustic input signal components 32a will be applied in subsequent steps, e.g. at each location on the surface of sample 5 to be measured. For example, each step will apply a single acoustic input signal component 32a, such that the $i^{th}$ step will apply the $i^{th}$ acoustic input signal component 32a-i at frequency $f_{e(i)}$. Or, in accordance with another example, each step will apply a two acoustic input signal components 32a, such that the $j^{th}$ step will apply the $(2j-1)^{th}$ and the $2j^{th}$ acoustic input signal component at frequencies $f_{c(2j-1)}$ and $f_{c(2j)}$. For the below explanation, the former example will be followed wherein each step contains only a single one of the acoustic input signal components 32a. The both acoustic signals 22 and 23 contain only the momentarily applied acoustic signals during that step, and will result in a mixed signal applied as input signal to the sample 5. Thus in the example, the mixed signal comprises the frequency components fed) and $f_{s(i)}$, the sum frequency $f_{high\_1}=f_{c(i)}+f_{s(i)}$, and the differential frequency $f_{diff}=|f_{c(i)}-f_{s(i)}|$. Responsive to the applied acoustic input signal, the probe tip 9 of the probe 2 is pressed into and out of the surface of sample 5, thereby indenting the surface. These indentations can be measured by monitoring the output signal 26. Hence, the output signal 26 also includes a signal at the modulation frequency $f_{m(i)}$, which will be used to perform the subsurface measurement in accordance with the invention. The differential frequency or modulation frequency $f_{m(i)}$ is near one of the contact resonance frequencies of the probe 2 and can be sensed via the cantilever 8. If multiple different modulation frequencies $f_m$ are applied to enable simultaneous application of multiple acoustic input signal components 32a, these modulation frequencies $f_m$ must be close to different contact resonance frequencies (e.g. within the range of $0.8*f_{resonant}<f_m<1.2*f_{resonant}$) where $f_{resonant}$ is the respective contact frequency for that modulation frequency. Alternatively the Q factor of the cantilever (or of a second order resonating system) is $Q=f/D_f$, wherein Dr is the full width half maximum. Q may be in the order of 1's, 10's, 100's or so and depends on the contact conditions for the same cantilever. It provides information about how sharp the resonance is, so this parameter may likewise be used to define the range. Thus, defining $D_f=f/Q$ as the full width at half maximum (FWHM), the range may be defined as $(1-0.5/Q))*f_{resonant}<f_m<(1+0.5/Q))*f_{resonant}$.

Each of the applied acoustic input signal components 32a will be conveyed through the sample 5 and scatter against any encountered embedded structure or interface. Therefore information on embedded sub-surface structures can be obtained from the output signal 26, responsive to the applied momentary acoustic input signal component 32a, that is obtained by the probe 2 in response to the acoustic input signal 22. By mixing the two acoustic signals 22 and 23, this information may also be obtained from the signal component of the output signal 26 at the modulation frequency $f_m$. Therefore, the output signal 26 contains information on sub-surface structures. However, as the objective is to obtain the pulse response to a desired or ideal pulse signal, it is necessary to obtain all the output signals 26 responsive to each one of the plurality of acoustic input signal components 32a. In particular, the application of each acoustic input signal component 32a-i will locally at a specific location on the surface of the sample 5 where the probe tip 9 may be in contact with the surface, give rise to a local output signal 26 having a specific amplitude A and phase φ. These local output signals 26 are provided to the analysis system 30. The analysis system obtains these values by comparing (filter element 36) the output signals 26 with a reference signal 27 that contains the associated modulation frequency $f_m$ used for that acoustic input signal component 32a, such as to obtain these values for the amplitude A and phase φ (output 37).

By applying each of the acoustic input signal components 32a and locally measuring the amplitude A and phase φ of the responsive output signal 26, a set of measurement values is obtained indicative of the frequency dependency of A and φ, i.e. the A(f) and φ(f). Using the analysis system 30 or a different system, these can be inverse fast Fourier transformed (IFFT) into the time domain to obtain an output signal indicative of a pulse response signal to the desired or ideal pulse signal. In the analysis system 30, the eventual output signal in the time domain, which is indicative of the pulse response signal to the desired or ideal pulse signal, may be compared to the desired or ideal pulse signal to obtain a local response to the pulse. By mapping these location dependent response values, sub-surface structures may be visualized with high resolution (e.g. for frequencies of ~1-3 GHz, and at depths of 5 micrometer, the resolution may be 1-2 micrometer) and at low noise level and thus good SNR, in accordance with the present invention.

Figure 2:
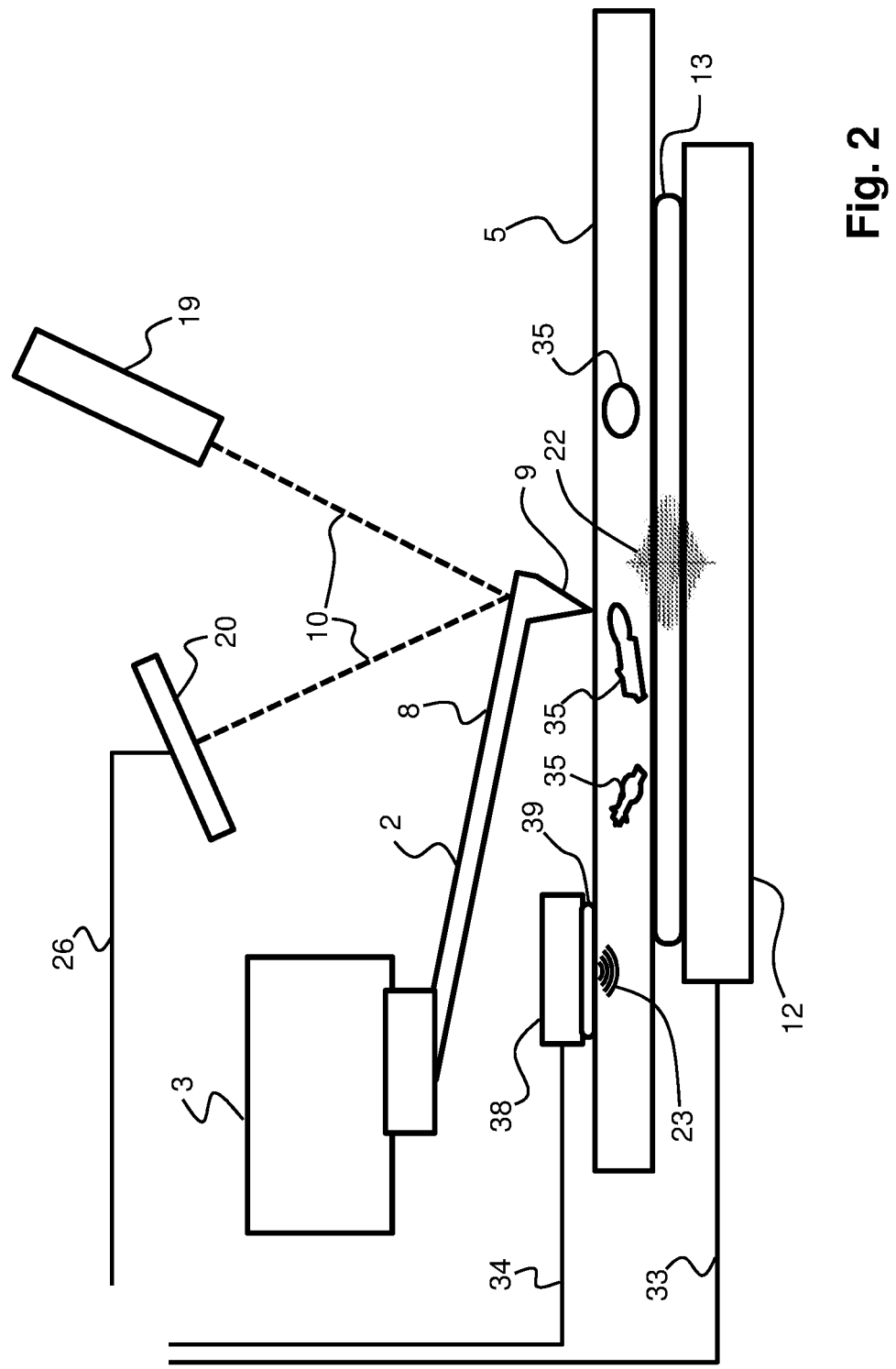
FIG. 2 schematically illustrates a system in accordance with an further embodiment of the invention, for performing a method in accordance with the invention.

In FIG. 1, the acoustic signals are partly applied to the bottom of the sample 5 via transducer 15 and partly to the probe tip 9 via transducer 18. However, the invention is not limited in this respect and the acoustic signals may be applied using various different methods. In the embodiment of FIG. 2, the input signal 23 is applied via a transducer 38 and an additional coupling medium 39 directly to the sample 5. In the embodiment of FIG. 2, application of the input signal 23 is via the transducer 38 from above (i.e. the surface of the sample 5), but the skilled person may appreciate that the acoustic input signal 23 may also be applied from the side of the sample 5 or from underneath the sample 5.

In addition to the embodiment of FIG. 1, the embodiment of FIG. 2 illustrates that it is not an absolute requirement to apply the acoustic input signal 23 via the probe tip. With the method of the present invention, using continuous wave transducers such as transducer 12, the plurality of acoustic input signal components 32a aggregate after IFFT into a strong composite signal indicative of a pulse response to the mimicked pulse signal, which is sufficiently strong to overcome the any occasional disadvantageous effects of deteriorated coupling in any of the embodiments. Hence, as a further advantage, the present invention renders these embodiments of FIGS. 1-3 to be well configured for sub-surface sensing by heterodyne force microscopy.

Figure 3:
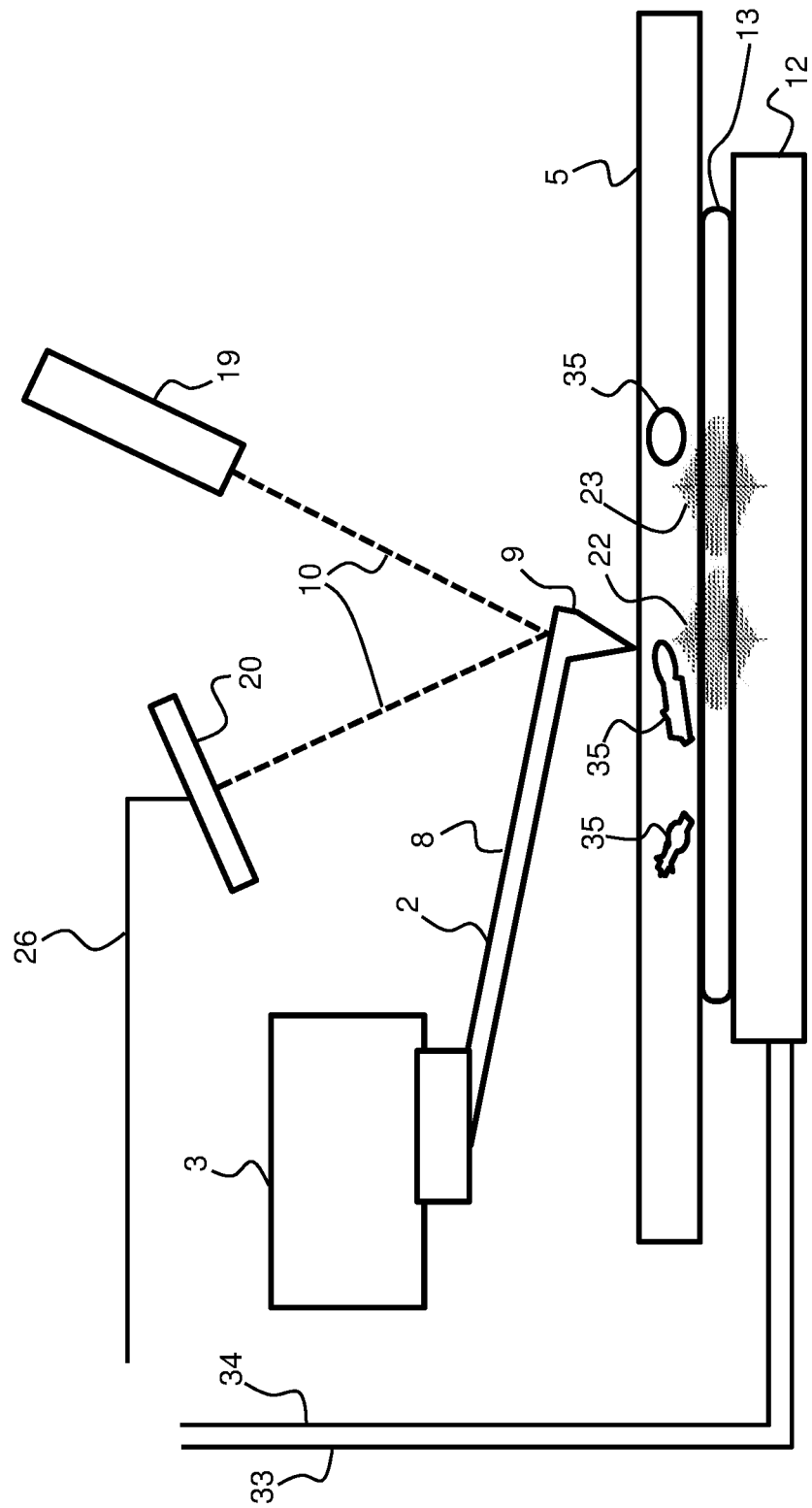
FIG. 3 schematically illustrates a system in accordance with another embodiment of the invention, for performing a method in accordance with the invention.

In yet another embodiment, which is illustrated in FIG. 3, both acoustic input signals 22 and 23 are applied via the transducer 12 underneath the sample 5. Here, the both input signal parts 33 and 34 are provided to the transducer 12 as is schematically illustrated in FIG. 3. Like in FIG. 2, the created indentations by the probe tip 9 at the surface of sample 5 may be picked up via the sensing system, providing an output signal 26 obtained via the optical detector 20. The embodiment of FIG. 3 has the further advantage of not requiring any further transducers other than the transducer 12 underneath the sample 5.

In addition to the above, it is observed that it is not essential to apply an optical sensing technique to determining probe deflection. In fact any suitable type of probe deflection sensor may be applied. Alternative sensing techniques for example include the application of a piezo-resistive layer on the cantilever, the electrical resistance of which vary with probe deflection. Probe deflection may in that case be detected by detecting voltage differences in an electric signal applied to the piezo-resistive layer. As another alternative, probe deflection may be detected using a piezo-electric element or layer, the potential of which changes dependent on cantilever motion. Alternatively, capacitive measurements may be applied in an electrostatic sensing technique. As some further alternatives, one may also apply an interferometer to measure probe deflection or perform a heat flux measurement in a thermal method by using a temperature difference between probe and sample. The skilled person will be familiar with such techniques and is able to apply them in embodiments of the present invention.

Figure 4A:
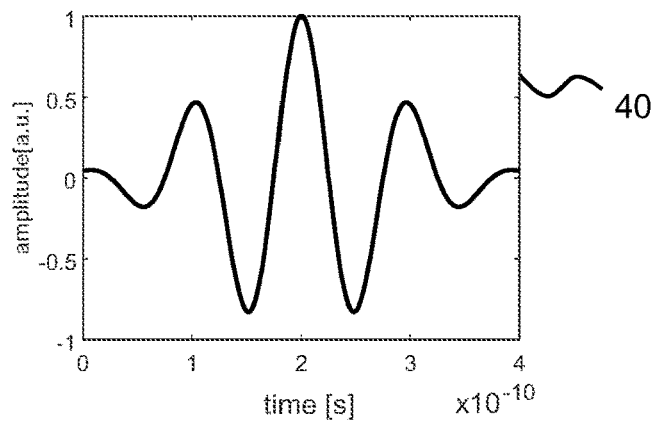
FIGS. 4a to 4g schematically illustrate a method in accordance with an embodiment wherein the selected frequencies to be applied as acoustic input signal components are obtained from an FFT of a desired ideal pulse signal.
Figure 4B:
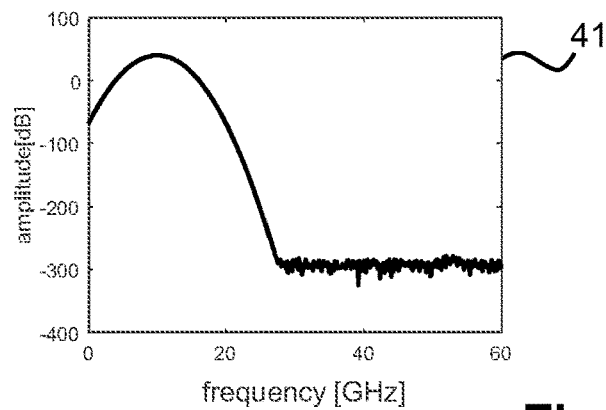
Figure 4C:
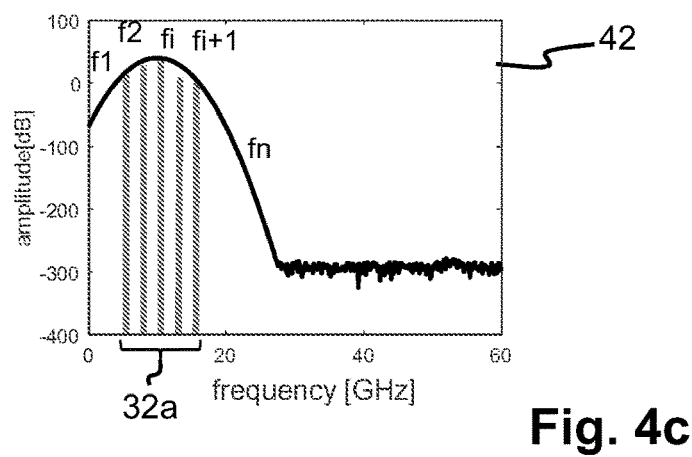

FIGS. 4a to 4g schematically illustrate a method in accordance with an embodiment wherein the selected frequencies to be applied as acoustic input signal components 32a (see e.g. FIG. 1) are obtained from an FFT of an desired ideal pulse signal 40. Alternatively, selected frequencies may be obtained in a different manner, e.g. by selecting a number of frequencies in a certain frequency range above 1 GHz. For now, we assume that it is the intention to interrogate sample 5 with the illustrated pulse 40 in the time domain, but that the system (e.g. system 1 of FIG. 1) only has continuous wave excitation capabilities. In accordance with the illustrated embodiment, the ideal pulse signal 40 shown in FIG. 4a is transformed, using FFT, into the frequency domain. The transformed pulse 41 in the frequency domain is illustrated in FIG. 4b. Next step, in graph 42 of FIG. 4c, is to select a plurality of frequencies that enable to mimic the pulse 40. This is done by selecting a number of frequencies near the response maximum in the amplitude response 42 in the frequency domain, as illustrated in FIG. 4c. In the range of interest, the frequency behavior is discretize with a sufficient number of frequencies, optionally including registration of response amplitude and phase. These selected frequencies, e.g. in the figure these are $f_1$, $f_2$, $f_i$, $f_{i+1}$ until $f_n$, optionally with amplitude and/or phase, will form the acoustic input signal components 32a to be applied sequentially.

Figure 4D:
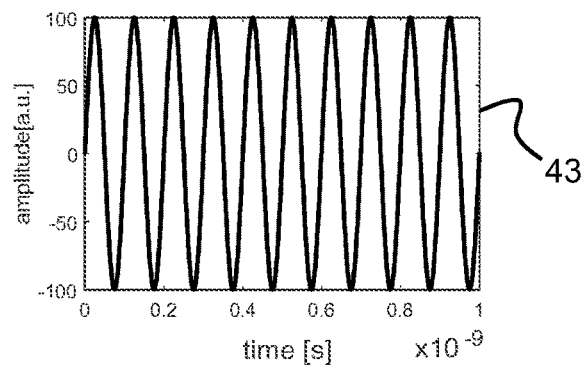
Figure 4E:
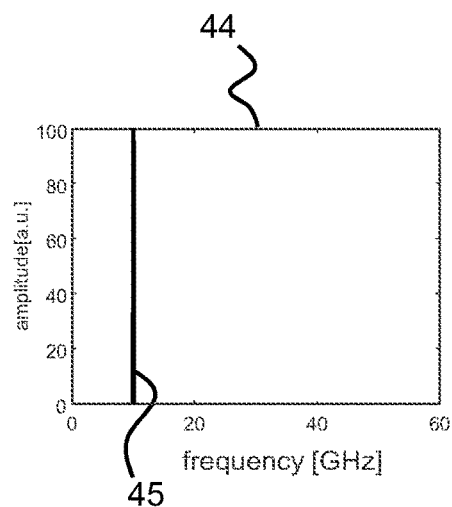
Figure 4F:
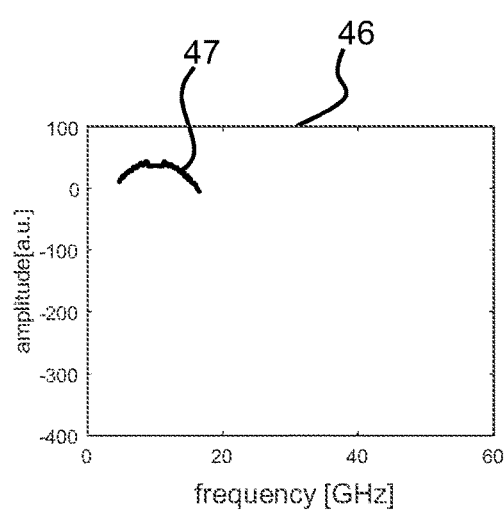
Figure 4G:
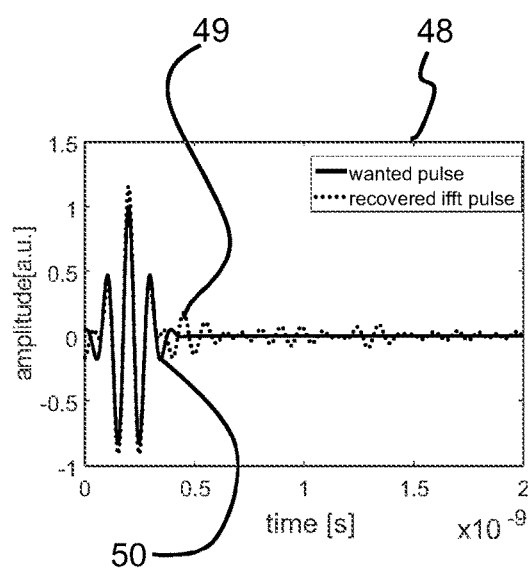

The next step will be to apply each of the selected frequencies, using e.g. the system 1 of FIG. 1, to the sample 5 sequentially (or two at a time in a number of sequential steps). Each frequency line in the frequency domain 42 corresponds to a continuous sine wave excitation in the time domain. To apply the acoustic input signal 32 by subsequently applying the acoustic input signal components 32a, in each excitation step of the SSPM measurement a continuous wave excitation such as signal 43 illustrated in FIG. 4d. This will be done for each location on the surface of the sample 5 that needs to be measured, e.g. each location of a scan area. The are different ways to perform this. For example, in each location, the various acoustic input signal components 32a may sequentially be applied and a measurement may be taken from each location, such as to determine the local amplitude A or phase φ of the response signal at that location. Alternatively, the scan area on the surface of the sample 5 may subsequently be scanned completely while applying a single acoustic input signal component 32a each time, until all acoustic input signal components 32a have been applied and measurements are obtained for each location of the scan area. Alternative ways of applying the acoustic input signal components 32a and scanning the surface may likewise be applied, without departing from the inventive concept. FIGS. 4d and 4e respectively illustrate a single acoustic input signal component in the time domain 43 and in the frequency domain 44, the latter showing a single peak 45 at the particular selected frequency.

The local amplitude A and phase q of the response signal will be obtained at each location, such that for each location a number of measurements in the frequency domain of the amplitude A and phase q are available. In the frequency domain, the amplitude A and phase φ are dependent on the frequency such that they may be written as A(f) and φ(f). The measurements at each of the selected frequencies provides a sample of A(f) and φ(f) for a number of frequencies, from which the frequency dependent amplitude response 47 in graph 46 of FIG. 4f can be obtained. Likewise, the frequency dependent amplitude response (not illustrated) can be obtained in a similar way. The example 47 in FIG. 4f includes an amplitude dip and some white noise. By applying IFFT, the frequency dependent amplitude response 47 (and similar, the frequency dependent phase response) can be transformed into the time domain. This yields the signal response 49 that is to be expected from applying the ideal pulse 50 directly to the sample, illustrated in FIG. 4g. From the signal 49, in particular the significant part of it (which overlaps non-zero part of the ideal pulse 50), a strong pulse response signal is obtained from which the embedded structures and other features of the sample can be detected in high resolution, suitable for imaging.

Figure 5:
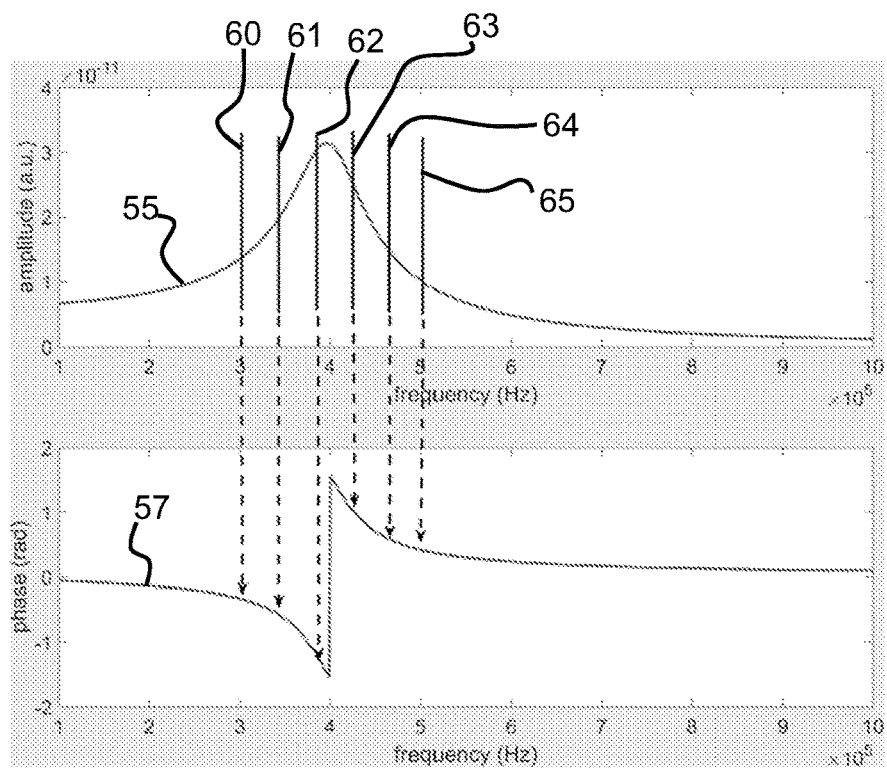
FIG. 5 illustrates an amplitude and phase response near a resonant mode in an embodiment of the invention.

In FIG. 5, the amplitude and phase response of a cantilever 8 are illustrated near a resonant mode (here the ground mode). The resonance frequency of this mode is at 400 kHz. Around this frequency, as follows from the amplitude response 55, the amplitude of the cantilever peaks when stimulated at a frequency within this sensitivity range. Considering the phase response 57, it is well known that the phase will make a phase jump of n radians. The hypothetical signals 60-65 are at distributed frequencies around the resonance frequency of 400 kHz. Clearly, for the phase it makes a significant difference whether the frequency of the signal to be measured (i.e. the modulation frequency in our case) is above or below the resonance frequency due to this phase jump. This must be taken into account by the analysis system 30 while analyzing the output signals 26.

Figure 6:
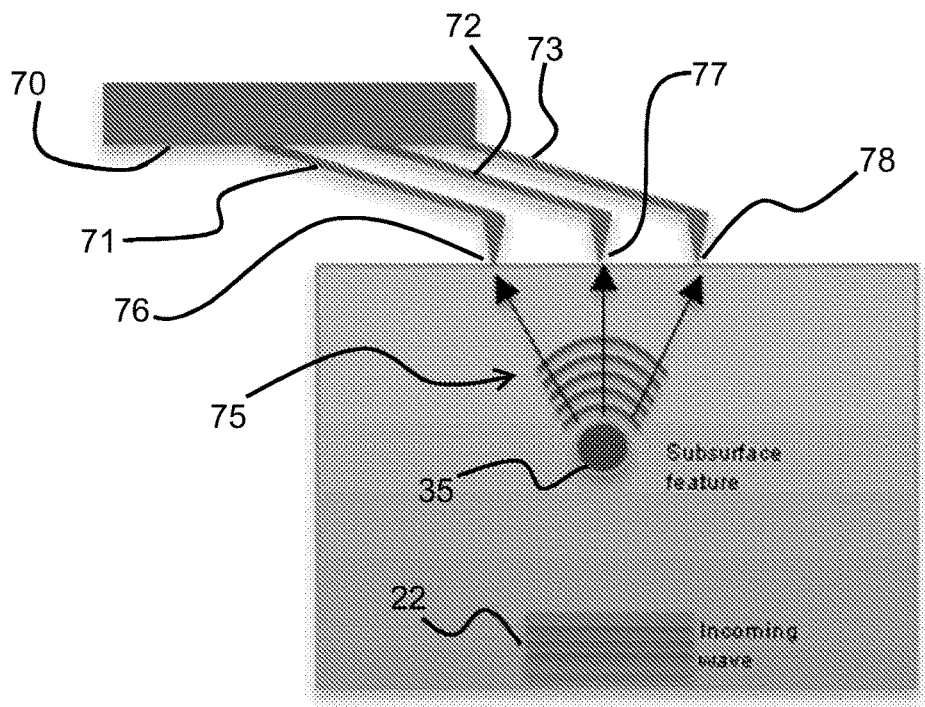
FIG. 6 illustrates an embodiment wherein a probe array is applied with multiple probes.

In FIG. 6, an embodiment is shown wherein a probe array 70 is applied with probes 71, 72 and 73. The array 70 enables to measure at multiple locations 76, 77 and 78 at the same time. Embedded structures 35 in the sample 5 will scatter the incoming acoustic signal 22 such as to provide a response signal field 75 wherein phase and amplitude will be location dependent. Using the array 70, measurements can be taken at a plurality of different locations simultaneously, enabling to increase performance of the method. The present invention presents a method based on advanced excitation waveforms to improve the strength of the sub-surface response signal in scattering based ultrasound sub-surface scanning probe microscopy (SSPM). The proposed excitation schemes results into a pulsed excitation, spatially resolved, less dependent on the sample characteristics. Pulsing scheme obtained may allow for deeper imaging, and ease bottom actuation, strengthen robustness, allowing imaging to improve SNR. Possible applications include overlay alignment on masks and wafers in semiconductor manufacturing processes, and metrology of sub-surface features. However, the technology may also be used in different fields of application, such as studying of biological tissue samples, oil and gas field with pipes inspection, corrosion monitoring, etc.

The present invention has been described in terms of some specific embodiments thereof. It will be appreciated that the embodiments shown in the drawings and described herein are intended for illustrated purposes only and are not by any manner or means intended to be restrictive on the invention. It is believed that the operation and construction of the present invention will be apparent from the foregoing description and drawings appended thereto. It will be clear to the skilled person that the invention is not limited to any embodiment herein described and that modifications are possible which should be considered within the scope of the appended claims. Also kinematic inversions are considered inherently disclosed and to be within the scope of the invention. Moreover, any of the components and elements of the various embodiments disclosed may be combined or may be incorporated in other embodiments where considered necessary, desired or preferred, without departing from the scope of the invention as defined in the claims.

In the claims, any reference signs shall not be construed as limiting the claim. The term 'comprising' and 'including' when used in this description or the appended claims should not be construed in an exclusive or exhaustive sense but rather in an inclusive sense. Thus the expression 'comprising' as used herein does not exclude the presence of other elements or steps in addition to those listed in any claim. Furthermore, the words 'a' and 'an' shall not be construed as limited to 'only one', but instead are used to mean 'at least one', and do not exclude a plurality. Features that are not specifically or explicitly described or claimed may be additionally included in the structure of the invention within its scope. Expressions such as: "means for . . . " should be read as: "component configured for . . . " or "member constructed to . . . " and should be construed to include equivalents for the structures disclosed. The use of expressions like: "critical", "preferred", "especially preferred" etc. is not intended to limit the invention. Additions, deletions, and modifications within the purview of the skilled person may generally be made without departing from the spirit and scope of the invention, as is determined by the claims. The invention may be practiced otherwise then as specifically described herein, and is only limited by the appended claims.

The invention claimed is:

1. A method of performing acoustic scanning probe microscopy for imaging of one or more embedded structures in a substrate underneath a substrate surface, the method comprising:
   applying, using a signal application actuator, an acoustic input signal to the substrate, wherein the acoustic input signal has a frequency above 1 gigahertz;
   detecting, using a probe of a scanning probe microscope, an acoustic return signal from the substrate; and
   analyzing the acoustic return signal to obtain information on the one or more embedded structures, for enabling imaging of the one or more embedded structures;
   wherein the applying the acoustic input signal comprises applying a plurality of acoustic signal components, wherein each acoustic signal component, of the plurality of acoustic signal components, includes a selected frequency,
   wherein the detecting includes detecting, for each acoustic signal component, of the plurality of acoustic signal components, a response signal associated with the respective acoustic signal component of the plurality of acoustic signal components;
   wherein frequencies of the plurality of acoustic signal components are selected such that together the plurality of acoustic signal components provide a composite signal, and
   wherein the composite signal is a pulse signal of limited time duration.

2. The method according to claim 1, wherein applying the acoustic signal components is performed in a plurality of application steps, wherein at least one acoustic signal component of the plurality of acoustic signal components is applied during each application step of the plurality of application steps.

3. The method according to claim 2, wherein only a single acoustic signal component is applied during each application step, and
   wherein the detecting the response signal associated with the respective acoustic signal component is performed during the application step thereof.

4. The method according to claim 1, wherein each acoustic signal component is applied having a carrier frequency at the selected frequency associated with the respective acoustic signal component and a modulation frequency such that a frequency difference between the carrier frequency and the modulation frequency is within a sensitivity range of the probe, and wherein the sensitivity range of the probe is provided by at least one range of frequencies around a resonant mode of the probe so as to provide a detectable response signal.

5. The method according to claim 4, wherein at least a first acoustic signal component and a second acoustic signal component of the plurality of acoustic signal components are applied simultaneously, such that:
   the first acoustic signal component is applied having a first frequency difference within a first sensitivity range around a first resonant mode of the probe, and
   the second acoustic signal component is applied having a second frequency difference within a second sensitivity range around a second resonant mode of the probe,
   wherein the first resonant mode is different from the second resonant mode.

6. The method according to claim 1, wherein each acoustic signal component is applied at a selected amplitude, and
   wherein each selected amplitude of each of the plurality of acoustic signal components is selected so as to correspond with each amplitude of each selected frequency obtained from a Fourier transform of the composite signal.

7. The method according to claim 1, wherein each acoustic signal component is applied at a selected phase, and
   wherein each selected phase of each of the plurality of acoustic signal components are selected so as to correspond with each phase of each selected frequency obtained from a Fourier transform of the composite signal.

8. The method according to claim 1, wherein the analyzing the acoustic return signal includes analyzing at least one of an amplitude or a phase of the acoustic return signal.

9. The method according to claim 8,
   wherein the probe includes a cantilever and a probe tip, and wherein the detecting the acoustic return signal is performed by scanning the probe relative to the substrate in a direction parallel to the substrate surface so that the probe tip, continuously or periodically, is in contact with the substrate surface for obtaining measurements of the acoustic return signal in a plurality of surface locations,
   wherein the detecting the response signal associated with the respective acoustic signal component of the plurality of acoustic signal components is performed in each of the plurality of surface locations, and
   wherein at least one of the amplitude or the phase of each return signal associated with each acoustic signal component is analyzed for each of the plurality of surface locations, such-so as to provide a measurement map including the at least one of the amplitudes or phases of each return signal.

10. The method according to claim 8, wherein the detecting the acoustic return signal is performed using a probe array comprising a plurality of probes so as to enable simultaneously obtaining the measurements in multiple of the plurality of surface locations, and
    wherein at least one of the amplitude or the phase of each return signal associated with each acoustic signal component is analyzed for each of the plurality of surface locations, so as to provide a measurement map including the at least one of the amplitudes or phases of each return signal.

11. The method according to claim 8, wherein the probe includes a cantilever and a probe tip, and wherein the detecting the acoustic return signal is performed by scanning the probe relative to the substrate in a direction parallel to the substrate surface so that the probe tip, continuously or periodically, is in contact with the substrate surface for obtaining measurements of the acoustic return signal in a plurality of surface locations,
wherein the detecting the response signal associated with the respective acoustic signal component of the plurality of acoustic signal components is performed in each of the plurality of surface locations,
wherein the detecting the acoustic return signal is performed using a probe array comprising a plurality of probes so as to enable simultaneously obtaining the measurements in multiple of the plurality of surface locations, and
wherein at least one of the amplitude or the phase of each return signal associated with each acoustic signal component is analyzed for each of the plurality of surface locations, so as to provide a measurement map including the at least one of the amplitudes or phases of each return signal.

12. The method according to claim 1, wherein the probe includes a cantilever and a probe tip, and wherein the detecting the acoustic return signal is performed by scanning the probe relative to the substrate in a direction parallel to the substrate surface so that the probe tip, continuously or periodically, is in contact with the substrate surface for obtaining measurements of the acoustic return signal in a plurality of surface locations, and
wherein the step of detecting the response signal associated with the respective acoustic signal component of the plurality of acoustic signal components is performed in each of the plurality of surface locations.

13. The method according to claim 12, wherein the detecting the acoustic return signal is performed using a probe array comprising a plurality of probes so as to enable simultaneously obtaining the measurements in multiple of the plurality of surface locations.

14. The method according to claim 1, wherein the analyzing further comprises:
obtaining information on embedded structures, from the return signals of the plurality of acoustic signal components for at least one surface location, and
performing an inverse Fourier transform so as to obtain a pulse response signal in a time domain indicative of a response to the pulse provided by the composite signal.

15. The method according to claim 1, wherein the probe includes a cantilever and a probe tip, and
wherein the method further comprises, prior to performing applying, the detecting and the analyzing, a step of determining a cantilever phase response around at least one resonant mode of the probe, including:
applying a reference carrier frequency and at least one reference modulation frequency, and sweeping the reference modulation frequency such as to provide a varying frequency difference;
detecting, using the probe wherein the probe tip is in contact with the substrate surface, a reference response signal; and
analyzing the reference response signal to determine a phase response of the cantilever around the at least one resonant mode of the probe.

16. An acoustic scanning probe microscopy system comprising:
a scan head including a probe, wherein the probe includes a cantilever and a probe tip,
a substrate carrier for holding a substrate having a substrate surface,
wherein the system is configured for scanning the scan head relative to the substrate carrier for scanning the substrate surface with the probe, such that the probe tip is in contact with the substrate surface continuously or at least periodically,
wherein the system further comprises a controller and a memory operatively connected to the controller,
wherein the system is configured for receiving one or more instructions that, when loaded in the memory of the system cause the controller to control the system so as to carry out a method including:
applying, using a signal application actuator, an acoustic input signal to the substrate, wherein the acoustic input signal has a frequency above 1 gigahertz;
detecting, using the probe, an acoustic return signal from the substrate; and
analyzing, by the controller, the acoustic return signal to obtain information on the embedded structures, for enabling imaging of the embedded structures;
wherein the applying the acoustic input signal comprises applying a plurality of acoustic signal components, wherein each acoustic signal component, of the plurality of acoustic signal components, includes a selected frequency,
wherein the detecting includes detecting, for each acoustic signal component of the plurality of acoustic signal components, a response signal associated with the respective acoustic signal component;
wherein frequencies of the plurality of acoustic signal components are selected such that together the plurality of acoustic signal components provide a composite signal, and
wherein the composite signal is a pulse signal of limited time duration.

17. A non-transitory computer-readable medium including computer-executable instructions, for use in an acoustic scanning probe microscopy system comprising:
a scan head including a probe, wherein the probe includes a cantilever and a probe tip,
a substrate carrier for holding a substrate having a substrate surface,
wherein the system is configured for scanning the scan head relative to the substrate carrier for scanning the substrate surface with the probe, such that the probe tip is in contact with the substrate surface continuously or at least periodically,
wherein the system further comprises a controller,
wherein the computer-executable instructions cause the controller to control the system to carry out a method including:
applying, using a signal application actuator of the system, an acoustic input signal to a substrate held by a substrate carrier, wherein the acoustic input signal has a frequency above 1 gigahertz;
detecting, using a probe of the system, an acoustic return signal from the substrate; and
analyzing, by the controller, the acoustic return signal to obtain information on embedded structures in the substrate underneath a substrate surface, for enabling imaging of the embedded structures;

wherein the applying the acoustic input signal comprises applying a plurality of acoustic signal components, wherein each acoustic signal component, of the plurality of acoustic signal components, includes a selected frequency, wherein the detecting includes detecting, for each acoustic signal component, of the plurality of acoustic signal components, a response signal associated with the respective acoustic signal component;

wherein frequencies of the plurality of acoustic signal components are selected such that together the plurality of acoustic signal components provide a composite signal, and wherein the composite signal is a pulse signal of limited time duration.

* * * * *